Oct. 6, 1964  J. E. HOERNER  3,151,414
FISH LINE SINKER
Filed Aug. 8, 1963

INVENTOR.
JACK E. HOERNER
BY
*LeBlanc and Shur*
ATTORNEYS.

United States Patent Office 3,151,414
Patented Oct. 6, 1964

3,151,414
FISH LINE SINKER
Jack E. Hoerner, P.O. Box 576, Columbia Falls, Mont.
Filed Aug. 8, 1963, Ser. No. 300,781
2 Claims. (Cl. 43—44.97)

This invention relates to fishing tackle and more particularly to the provision of a novel sinker for fish lines which helps to prevent fouling or snagging of the tackle on rocks and other underwater projections.

Every fisherman is faced with the universal problem of losing lures and weights (sinkers) when fishing in waters filled with weeds or having an irregular bottom. The problem is particularly aggravated when casting or trolling in rocky, fast moving rivers. In this type of fishing it is not at all unusual for a fisherman to lose six to ten lures and sinkers in a few hours. After casting and when the line is being reeled in, there is a tendency for the weight to wedge in between rocks and for the lure or hook to snag on the rocks.

The present invention provides a flexible spring metal weight or sinker which substantially reduces the above-mentioned loss of tackle and which has proved exceedingly successful, particularly in rocky fast-moving rivers. The sinker of the present invention is made of spring material such as spring steel and imparts a continuous movement or wriggling action to the bottom of the line as it is moved through the water which acts to prevent snagging or wedging of the line.

Various so-called non-snag devices including sinkers have been provided in the past. However, for the most part, these have been directed to releasing the line after snagging rather than to the prevention of snagging as is the device of the present invention. In addition, prior non-snag sinkers have been usually constructed of rubber which, in a practical size and shape has insufficient weight to act as a sinker and which is subject to deterioration under the influence of the elements. Prior resilient sinkers made of rubber have required the incorporation of lead weights or the like to provide sufficient weight thus resulting in a device too expensive for the average fisherman.

It is therefore one object of the present invention to provide a novel weight or sinker for fish lines.

Another object of the present invention is to provide novel non-snag fishing tackle.

Another object of the present invention is to provide a springy metallic fish sinker.

Another object of the present invention is to provide a novel fish sinker particularly suited for use in casting and trolling.

Another object of the present invention is to provide an inexpensive non-snag fish sinker.

These and further objects and advantages of the invention will be more apparent upon reference to the following specification, claims and appended drawings wherein:

Figure 1:
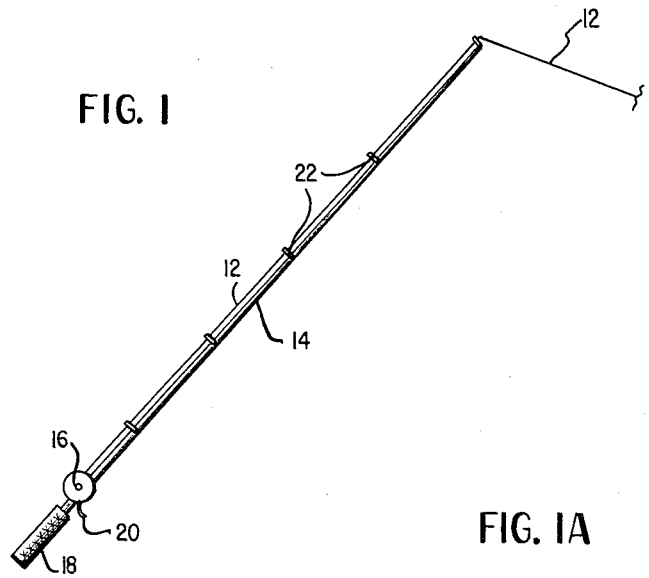
FIGURES 1 and 1A show the novel sinker of the present invention attached to a fish line.
Figure 1A:
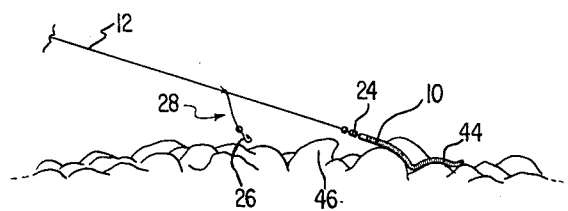

Referring to the drawings, the novel sinker indicated at 10 in FIGURE 1A is connected to a fish line 12 depending from the end of a conventional fish pole including a rod 14 and a reel 16 shown in FIGURE 1. The fish pole is provided with a standard handle 18 and finger grip 20 and is provided with a plurality of eyelets 22 through which the line passes. Sinker 10 is connected to the end of the line 12 by a conventional swivel 24.

Connected to the line 12 above the swivel may be one or more bait hooks such as hook 26 connected to line 12 by a short leader 28.

Figure 2:
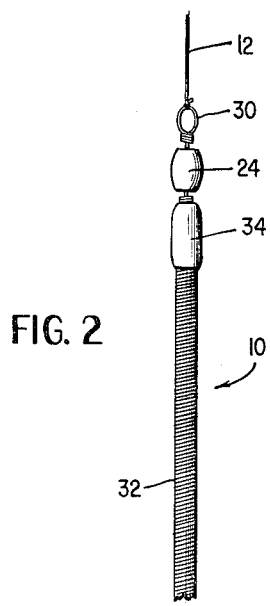
FIGURE 2 is an enlarged view of the sinker of FIGURE 1.
Figure 3:
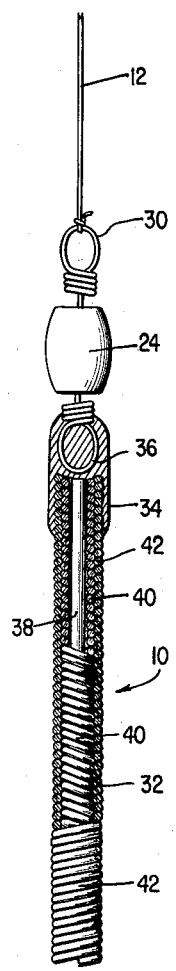
FIGURE 3 is a further enlargement with parts in section showing the construction of the sinker and its manner of attachment to a fish line.

Referring to FIGURES 2 and 3, there is shown the swivel 24 with its upper eyelet 30 suitably tied to the end of line 12. It is preferred that the lowermost hook 26 in FIGURE 1 be positioned slightly above the swivel and may be connected to the line about two feet from the swivel. Sinker 10 comprises a length of control cable 32 connected by solder at 34 to the other eyelet 36 of the swivel as shown in detail in FIGURE 3. The cable 32 is shown as consisting of a central spring steel wire 38 surrounded by an inner tightly wound helical coil 40 of spring steel and a similar but slightly larger outer tightly wound coil 42 also of spring steel. As illustrated, the respective coils 40 and 42 are preferably wound in the opposite direction.

The nature of the cable 32 is such that it readily flexes in a direction transverse to its longitudinal axis but when pressure is removed springs back to the straight position illustrated in FIGURES 2 and 3. FIGURE 1A shows the end 44 of the sinker 10 flexed sidewise by a stream or river bottom illustrated generally at 46. The tightly wound nature of the coils prevents any significant elongation of the sinker.

While the substantial success of the sinker of the present invention during actual usage is not fully understood, it is believed that the relative motion of the line through the water particularly in casting or during trolling imparts vibrations to the sinker to cause a continuous serpentine or wriggling motion which prevents the tackle from being hooked by rocks or snags. Apparently because of the spring in the cable, any tendency for the swivel or hooks to become wedged or lodged between rocks is avoided by this wriggling of the sinker due to the tension and vibration on the line which is transmitted to the cable. It is also believed that the lower end of the cable engaging on the river bottom or on a rock causes the front half of the cable to spring upward or sidewise and over and around the rocks.

In the preferred embodiment illustrated the sinker 10 may be formed from a short length of conventional automobile speedometer cable. The joint 34 is formed by solder or suitable material which firmly connects the upper end of the sinker to one side of the swivel 24.

It is important that the overall length of the sinker 10 be much greater than its largest transverse dimension. It is further quite desirable that the cross section of the sinker be no greater than that of the swivel 24. In this way, the sinker is able to pass through any opening or clearance that the swivel 24 is capable of passing through. The length of the cable may be approximately 100 times its diameter. This of course tends to vary with weight requirements and thickness of cables as well as other factors. Sinkers of the type illustrated formed from a cable having an outer diameter of 3/16 of an inch and a length of from 18 to 20 inches have been found quite satisfactory.

It is apparent from the above that the present invention provides a novel, wriggling type metallic fish line sinker which substantially avoids the problem of snagging or catching the fish tackle on submerged objects and on the rocky bottom of a river or stream. The device is of relatively simple inexpensive construction which may be manufactured from conventional parts. Since it is constructed of metal it provides sufficient weight by itself for use as a fish sinker. While described in conjunction with hooks the sinker may also be used with artificial lures and is advantageous even for still fishing in fast moving waters. As distinguished from prior rubber devices, the metal sinker of the present invention is substantially immune to damaging deterioration from the elements and may be used for many years without replacement. Further, while described in conjunction with springy control cables, it is apparent that any long lasting material having sufficient weight and springiness may be utilized to form the sinkers of this invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A flexible sinker for fish lines comprising a length of cable having a central wire of spring steel, an inner helical winding of spring steel closely surrounding said wire, an outer helical winding of spring steel closely surrounding said inner winding, a swivel, and solder means connecting one end of said cable to one end of said swivel, said sinker being approximately one and one-half feet long.

2. A sinker according to claim 1 wherein said windings are wound in opposite directions.

References Cited in the file of this patent

UNITED STATES PATENTS

| | | |
|---|---|---|
| 1,250,053 | Tukey | Dec. 11, 1917 |
| 2,923,528 | Komorski | Feb. 2, 1960 |
| 3,057,110 | Michael | Oct. 9, 1962 |